United States Patent
Ohno et al.

(10) Patent No.: US 9,776,363 B2
(45) Date of Patent: Oct. 3, 2017

(54) THREE-DIMENSIONAL MODELING HEAD AND THREE-DIMENSIONAL MODELING DEVICE

(71) Applicant: KABUSHIKI KAISHA TOSHIBA, Tokyo (JP)

(72) Inventors: Hiroshi Ohno, Kanagawa (JP); Takashi Usui, Saitama (JP); Mitsuaki Kato, Kanagawa (JP); Junya Tanaka, Tokyo (JP); Yoshinori Mori, Kanagawa (JP); Kazuyo Narita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 408 days.

(21) Appl. No.: 14/535,440

(22) Filed: Nov. 7, 2014

(65) Prior Publication Data
US 2015/0140155 A1  May 21, 2015

(30) Foreign Application Priority Data

Nov. 15, 2013 (JP) ................................. 2013-237239

(51) Int. Cl.
*B29C 67/00* (2017.01)
*B33Y 30/00* (2015.01)

(52) U.S. Cl.
CPC ...... *B29C 67/0085* (2013.01); *B29C 67/0055* (2013.01); *B33Y 30/00* (2014.12)

(58) Field of Classification Search
CPC ............ B29C 67/0085; B29C 67/0055; B29C 67/0066; B29C 67/0062
(Continued)

(56) References Cited

U.S. PATENT DOCUMENTS 6,998,087 B1    2/2006  Hanson et al.
8,119,053 B1    2/2012  Bedal et al.
(Continued)

FOREIGN PATENT DOCUMENTS

JP    8-281810    10/1996
JP    11-302095   11/1999
(Continued)

OTHER PUBLICATIONS

Office Action from the Chinese Patent Office in corresponding Chinese Application No. 201410646151.4, dated Jun. 7, 2016, 9 pages.

*Primary Examiner* — Alison L Hindenlang
*Assistant Examiner* — Emmanuel S Luk
(74) *Attorney, Agent, or Firm* — Finnegan, Henderson, Farabow, Garrett & Dunner, L.L.P.

(57) ABSTRACT

According to an embodiment, a three-dimensional modeling head includes a heat insulating member, a light emitter, a cylindrical member, and a light absorbing member. The heat insulating member has a sealed space therein with a curved wall surface that reflects light. The light emitter emits light and has at least a light emitting face provided in the sealed space. The cylindrical member is placed to extend through the heat insulating member via the sealed space and is long in a first direction in which thermoplastic resin is ejected. The light absorbing member adsorbs light and is provided in contact with at least part of the cylindrical member in the sealed space and in an area of the sealed space containing a focusing position on which at least part of light emitted by the light emitter and reflected by the wall surface is focused.

14 Claims, 8 Drawing Sheets

(58) Field of Classification Search
USPC ................................. 425/375; 264/482, 425
See application file for complete search history.

(56) References Cited

U.S. PATENT DOCUMENTS

| | | | |
|---|---|---|---|
| 9,126,367 B1* | 9/2015 | Mark | .................. B29C 67/0085 |
| 2001/0030383 A1 | 10/2001 | Swanson et al. | |
| 2003/0056870 A1 | 3/2003 | Comb et al. | |
| 2003/0064124 A1 | 4/2003 | Comb | |
| 2005/0129941 A1 | 6/2005 | Comb et al. | |
| 2005/0208168 A1 | 9/2005 | Hickerson et al. | |
| 2008/0036117 A1 | 2/2008 | Hickerson et al. | |
| 2008/0122141 A1 | 5/2008 | Bedal et al. | |
| 2009/0295032 A1 | 12/2009 | Hopkins | |
| 2010/0244333 A1 | 9/2010 | Bedal et al. | |
| 2011/0168091 A1 | 7/2011 | Baumann et al. | |
| 2014/0141166 A1* | 5/2014 | Rodgers | .................. C08L 77/02 427/256 |
| 2014/0141168 A1 | 5/2014 | Rodgers | |
| 2014/0291886 A1* | 10/2014 | Mark | .................... B29C 47/004 264/163 |
| 2014/0328963 A1 | 11/2014 | Mark et al. | |
| 2015/0142159 A1* | 5/2015 | Chang | ................. B29C 67/0059 700/119 |
| 2016/0107380 A1* | 4/2016 | Smoot | .................. B29C 67/0062 264/401 |
| 2016/0194233 A1* | 7/2016 | Van Pelt | .................. C03B 19/00 65/32.4 |
| 2016/0229128 A1 | 8/2016 | Dayagi et al. | |
| 2016/0236372 A1 | 8/2016 | Benichou et al. | |
| 2016/0243619 A1 | 8/2016 | Gothait et al. | |
| 2016/0297104 A1* | 10/2016 | Guillemette | ............ B29C 70/28 |

FOREIGN PATENT DOCUMENTS

| | | |
|---|---|---|
| JP | 2003-534159 | 11/2003 |
| JP | 2004-504177 | 2/2004 |
| JP | 2005-503283 | 2/2005 |
| JP | 2007-529349 | 10/2007 |
| JP | 2010-521339 | 6/2010 |
| JP | 2013-224043 | 10/2013 |
| JP | 2016-505409 | 2/2016 |
| JP | 2016-518267 | 6/2016 |
| JP | 2017-504468 | 2/2017 |
| WO | WO 01/89714 A1 | 11/2001 |
| WO | WO 01/89814 A1 | 11/2001 |
| WO | WO 03/026872 A1 | 4/2003 |
| WO | WO 2014/197732 A2 | 12/2014 |
| WO | WO 2015/009938 A1 | 1/2015 |

* cited by examiner

THREE-DIMENSIONAL MODELING HEAD AND THREE-DIMENSIONAL MODELING DEVICE

CROSS-REFERENCE TO RELATED APPLICATION(S)

This application is based upon and claims the benefit of priority from Japanese Patent Application No. 2013-237239, filed on Nov. 15, 2013; the entire contents of which are incorporated herein by reference.

FIELD

Embodiments described herein relate generally to a three-dimensional modeling head and a three-dimensional modeling device.

BACKGROUND

Three-dimensional modeling devices using fused deposition modeling are known. A three-dimensional modeling device using fused deposition modeling melts and ejects thermoplastic resin through a nozzle to deposit the thermoplastic resin so as to form a three-dimensional modeled object. During ejection of the thermoplastic resin, the three-dimensional modeling device moves a head part provided with the nozzle. There is also disclosed a three-dimensional modeling device that ejects multiple kinds of thermoplastic resins having different melting points through flow tubes and nozzles provided for the respective thermoplastic resins.

For ejecting multiple kinds of thermoplastic resins having different melting points, the temperatures of the thermoplastic resins need to be controlled individually to the respective melting points or higher. Thus, there is disclosed a structure in which a heating rod is provided for each of the tubes through which the thermoplastic resins are supplied to the nozzles. Each heating rod is heated to the melting point of the corresponding thermoplastic resin or higher to melt the thermoplastic resin.

The related art, however, is disadvantageous in that the temperature of the melting area for melting thermoplastic resin is likely to be affected by external environment.

DETAILED DESCRIPTION

According to an embodiment, a three-dimensional modeling head includes a heat insulating member, a light emitter, a cylindrical member, and a light absorbing member. The heat insulating member has a sealed space therein with a curved wall surface that reflects light. The light emitter emits light and has at least a light emitting face provided in the sealed space. The cylindrical member is placed to extend through the heat insulating member via the sealed space and is long in a first direction in which thermoplastic resin is ejected. The light absorbing member adsorbs light and is provided in contact with at least part of the cylindrical member in the sealed space and in an area of the sealed space containing a focusing position on which at least part of light emitted by the light emitter and reflected by the wall surface is focused.

Embodiments will be described in detail below with reference to the accompanying drawings.

First Embodiment

Figure 1:
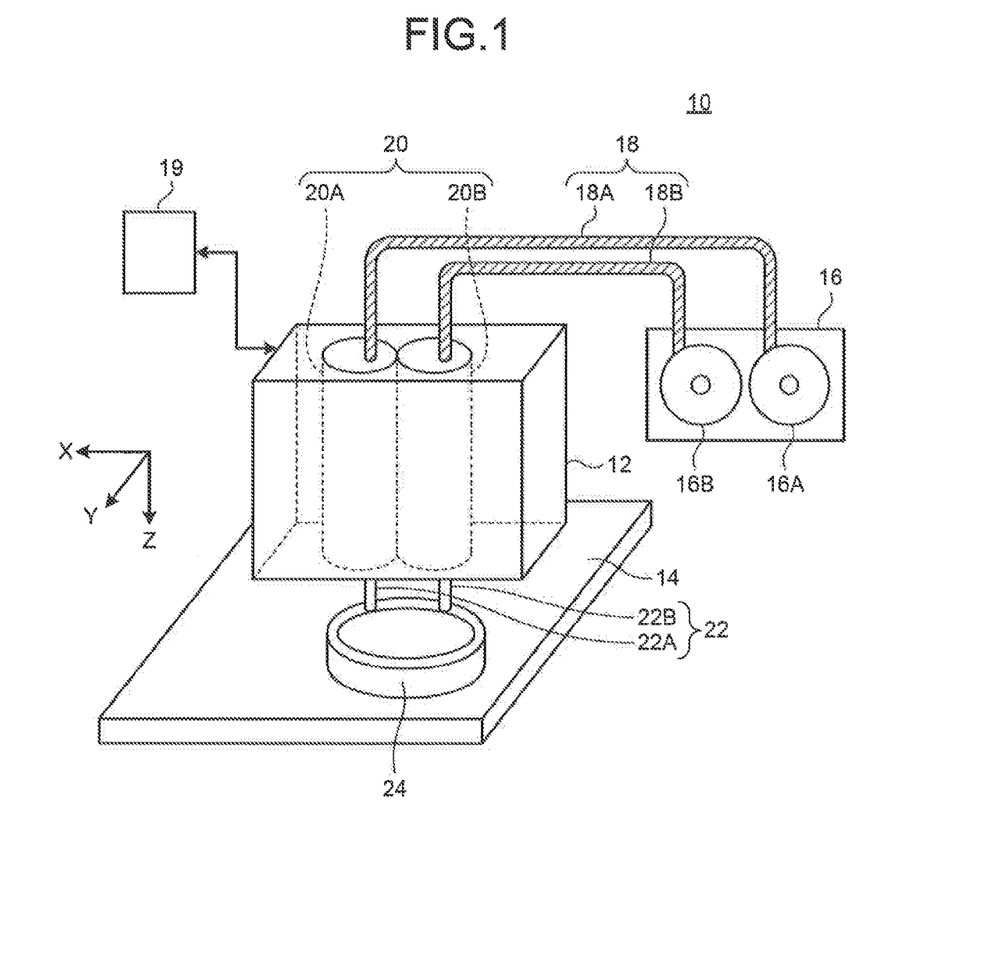
FIG. 1 is a diagram illustrating a three-dimensional modeling device.

FIG. 1 is a diagram illustrating an example of a three-dimensional modeling device 10.

The three-dimensional modeling device 10 models a three-dimensional modeled object 24. The three-dimensional modeling device 10 is a device using fused deposition modeling. Thus, the three-dimensional modeling device 10 models the three-dimensional modeled object 24 by melding and depositing thermoplastic resin 18.

The three-dimensional modeling device 10 includes a head part 12, a modeling table 14, a controller 19, and a cartridge 16.

The modeling table 14 is a table on which the three-dimensional modeled object 24 is modeled. The modeling table 14 has a plate-like shape. The modeling table 14 is movably supported in the direction of gravity (the Z-axis direction in FIG. 1) by a driving unit, which is not illustrated.

The head unit 12 is opposed to the modeling table 14.

The head unit 12 is supported by a moving unit (not illustrated). The moving unit moves the head unit 12 in the X-axis direction or in the Y-axis direction along an XY plane (a plane defined by the X-axis direction and the Y-axis direction) along the surface of the modeling table 14.

The head unit 12 includes multiple three-dimensional modeling heads 20. In the present embodiment, a three-dimensional modeling head 20A and a three-dimensional modeling head 20B are provided as the multiple three-dimensional modeling heads 20.

Note that the head unit 12 may have any structure including one or more three-dimensional modeling heads 20, and is not limited to the structure including two three-dimensional modeling heads 20. Furthermore, in the description of the present embodiment, the three-dimensional modeling head 20A and the three-dimensional modeling head 20B will be collectively referred to simply as three-dimensional modeling heads 20.

The three-dimensional modeling heads 20 melts and ejects the thermoplastic resin 18 through nozzles 22 to deposit the thermoplastic resin on the modeling table 14.

The thermoplastic resin 18 is resin melted by being heated to the melting point or higher. In the present embodiment, the three-dimensional modeling device 10 uses different kinds of thermoplastic resins 18 having different melting points for modeling of the three-dimensional modeled object 24. Note that the three-dimensional modeling device 10 may use one kind of thermoplastic resin 18 having the same melting point for modeling of the three-dimensional modeled object 24. Alternatively, the three-dimensional modeling device 10 may use multiple thermoplastic resins 18 for each kind of thermoplastic resins 18 for modeling of the three-dimensional modeled object 24.

In the present embodiment, the three-dimensional modeling device 10 uses a thermoplastic resin 18A and a thermoplastic resin 18B as the multiple kinds of thermoplastic resins 18. The thermoplastic resin 18A and the thermoplastic resin 18B will be collectively referred to simply as thermoplastic resins 18.

The thermoplastic resins 18 are molded into filaments in a solidified (crystallized) state at temperatures lower than the melting points in advance. The cartridge 16 winds and holds the thermoplastic resins 18 molded into filaments about cylindrical members (not illustrated).

In the present embodiment, the cartridge 16 includes a cartridge 16A and a cartridge 16B. The cartridge 16A winds and holds the thermoplastic resin 18A molded into a filament about a cylindrical member (not illustrated). The cartridge 16B winds and holds the thermoplastic resin 18B molded into a filament about a cylindrical member (not illustrated).

The thermoplastic resin 18A held by the cartridge 16A is supplied to the three-dimensional modeling head 20A. The three-dimensional modeling head 20A heats the thermoplastic resin 18A to the melting point thereof or higher to melt the thermoplastic resin 18A, and ejects the thermoplastic resin 18A through the nozzle 22A toward the modeling table 14.

The thermoplastic resin 18B held by the cartridge 16B is supplied to the three-dimensional modeling head 20B. The three-dimensional modeling head 20B heats the thermoplastic resin 18B to the melting point thereof or higher to melt the thermoplastic resin 18B, and ejects the thermoplastic resin 18B through the nozzle 22B toward the modeling table 14.

The controller 19 controls the entire three-dimensional modeling device 10. The controller 19 is electrically connected to the three-dimensional modeling heads 20 and the driving unit (not illustrated) configured to drive the modeling table 14. The controller 19 includes a central processing unit (CPU), a read only memory (ROM), and a random access memory (RAM).

The controller 19 of the three-dimensional modeling device 10 reads solid information indicating the shape and the like of the three-dimensional modeled object 24 to be molded from a storage unit that is not illustrated.

Alternatively the solid information may be input from an input unit that is not illustrated. Alternatively, the solid information may be received from an external device through a communication unit that is not illustrated.

The controller 19 controls the temperatures to which the thermoplastic resins 18 are heated by the respective three-dimensional modeling heads 20 to be equal to or higher than the melting points of the thermoplastic resins 18 supplied to the respective three-dimensional modeling heads 20. Each three-dimensional modeling head 20 is provided with a temperature sensor (not illustrated) at a melting area where the thermoplastic resin 18 is melted. The controller 19 receives a temperature detection result from a temperature sensor and controls the temperature at the melting area to the melting point of the corresponding thermoplastic resin 18 or higher.

The controller 19 then ejects the melted thermoplastic resin 18 through the nozzle 22. In this process, the controller 19 moves the position of the nozzle 22 that discharges each thermoplastic resin 18, and the head unit 12 according to the solid information, in the X-axis direction or in the Y-axis direction. Furthermore, in this process, the controller 19 controls the moving unit (not illustrated) configured to move the modeling table 14 in the Z-axis direction according to the height of the thermoplastic resins 18 deposited on the modeling table 14, the solid in formation, and the like. As a result, the three-dimensional modeled object 24 corresponding to the solid information is produced on the modeling table 14.

Note that the thermoplastic resins 18 are melted by being heated to temperatures equal to or higher than the melting points of the thermoplastic resins 18 as described above. Thus, the three-dimensional modeling device 10 needs to control the temperatures of the multiple kinds of thermoplastic resins 18 having different melting points individually to the respective melting points or higher.

In the related art, a heating rod for heating thermoplastic resin 18 is placed for each thermoplastic resin 18, and each heating rod is heated to the melting point of the corresponding thermoplastic resin or higher to melt the corresponding thermoplastic resin. There is thus a disadvantage that the melting areas for melting thermoplastic resins are likely to be affected by the temperature in the external environment.

Figure 2:
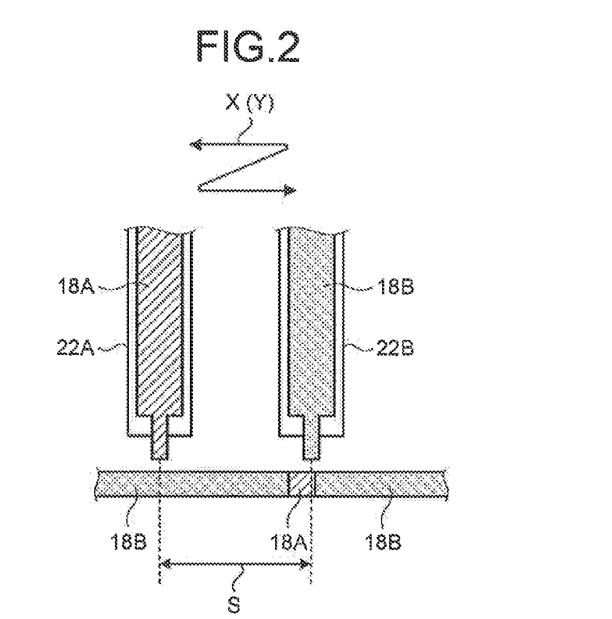
FIG. 2 is a diagram for explaining a stroke.

Furthermore, in the related art, to reduce the influence of the temperature in the external environment on the melting areas, the nozzles 22 need to be placed with spaces therebetween so as not to be affected by the temperatures of the other nozzles 22. Thus, a stroke S that is a distance between the nozzles 22 need to be long. Specifically, in the related art, a stroke S of 30 mm or longer is required.

FIG. 2 is a diagram for explaining the stroke S. As the stroke S between the nozzle 22A and the nozzle 22B is longer, the influence of the external environment on the temperatures of the nozzles is reduced. To extrude each of the thermoplastic resin 18A and the thermoplastic resin 18B onto desired areas on the modeling table 14 (see FIG. 1), however, the moving amount of the head unit 12 (see FIG. 1) in the X-axis direction or the Y-axis direction is larger as the stroke S is longer. Thus, in the related art, there is also a disadvantage that modeling the three-dimensional modeled object 24 takes a long time.

Figure 3:
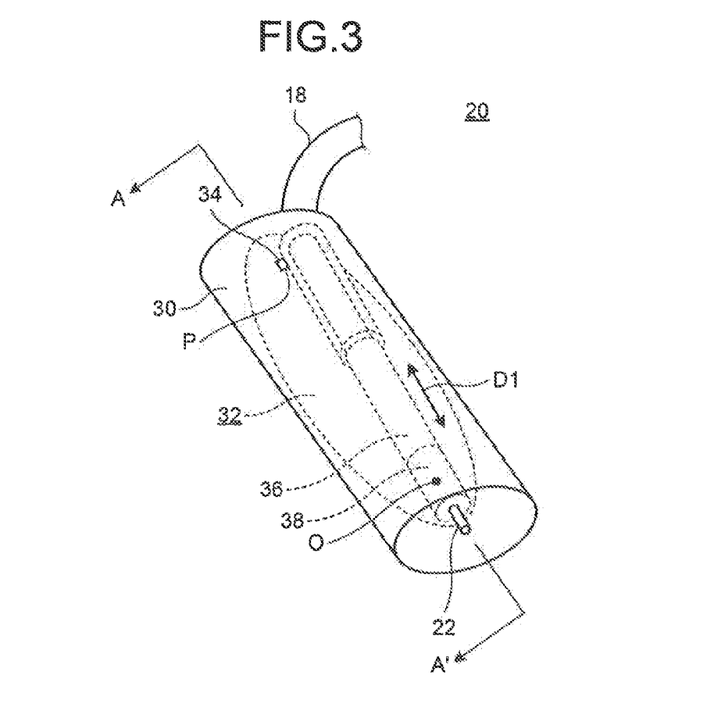
FIG. 3 is a perspective view of a three-dimensional modeling head.
Figure 4:
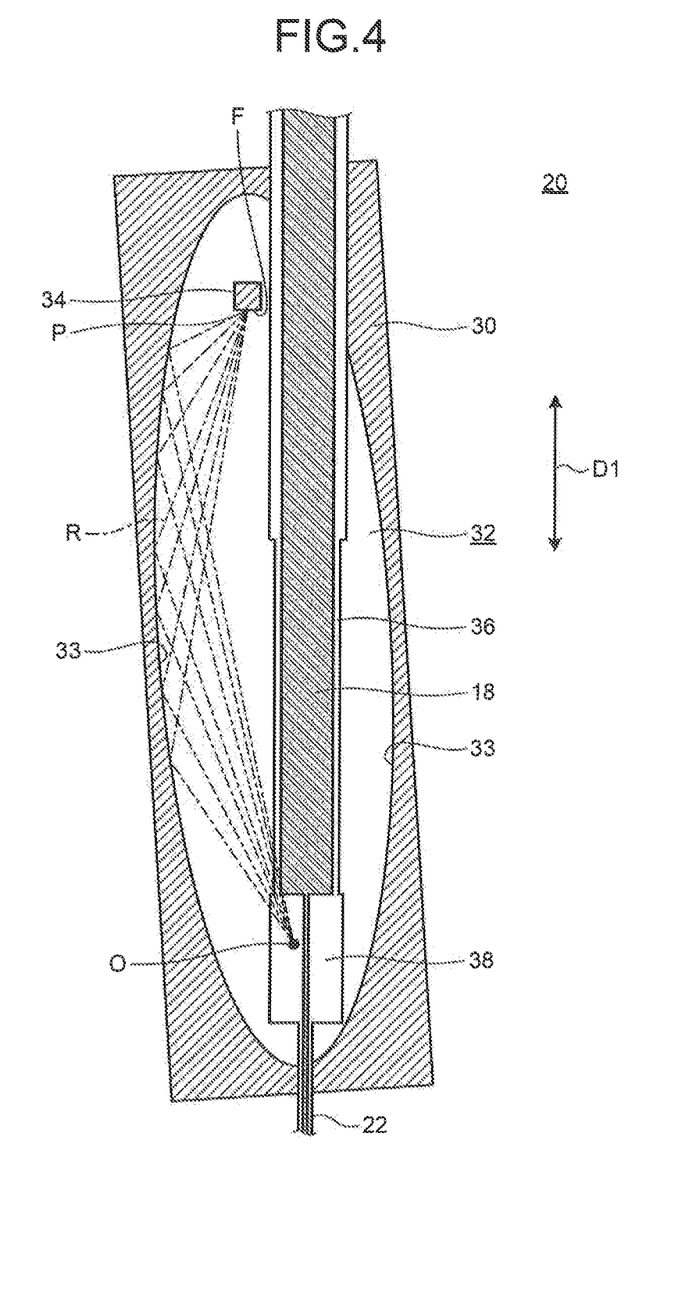
FIG. 4 is a sectional view of the three-dimensional modeling head taken along A-A'.

The three-dimensional modeling heads 20 according to the present embodiment therefore have a characteristic structure. FIG. 3 is a perspective view of a three-dimensional modeling head 20 according to the present embodiment. FIG. 4 is a sectional view of the three-dimensional modeling head 20 in FIG. 3 taken along A-A'.

The three-dimensional modeling head 20 includes a heat insulating member 30, a light emitter 34, a cylindrical member 36, the nozzle 22, and a light-absorbing member 38.

The heat insulating member 30 is made of a material having thermal insulation and heat resistance. The heat insulating member 30 is made of a material having a melting point higher than that of the thermoplastic resin 18 used for modeling of the three-dimensional modeled object 24 by the three-dimensional modeling device 10 and having thermal insulation and heat resistance, for example. Specifically, the material for the heat insulating member 30 is PEEK (polyetheretherketone) resin, but is not limited thereto.

The heat insulating member 30 has a sealed space 32 inside thereof. The sealed space 32 may be any sealed space and may be filled with air or vacuum. The heat insulating member 30 may have any size and shape capable of having a sealed space 32 therein. The sealed space need not necessary be sealed completely but may have a hole or the like communicating with outside.

The sealed space 32 has a curved wall surface 33 that reflects light. The wall surface 33 may be entirely curved or partial area thereof may be curved. The curved area of the wall surface 33 may have any curvature enough to focus at least part of light emitted from the light emitter 34 at a focusing position O, which will be described later.

The wall surface 33 of the sealed space 32 reflects light emitted by the light emitter 34. The wall surface 33 may have any structure that reflects light emitted by the light emitter 34, and preferably has a structure that regularly reflects light. When the wall surface 33 has a structure that regularly reflects light, the light focusing rate of light emitted by the light emitter 34 at the focusing position O is higher. Thus, light reflected by the wall surface 33 preferably includes a large amount of regularly reflected components and a smaller amount of diffusely reflected components.

The wall surface 33 is formed by grinding a surface of the heat insulating member 30 facing the sealed space 32 to such an extent that the surface can reflect light, for example. Alternatively, the wall surface 33 is formed by depositing metal such as aluminum on the surface of the heat insulating member 30 facing the sealed space 32. Alternatively, the wall surface 33 may be a glossy surface formed by applying a white coating to the surface of the heat insulating member 30 facing the sealed space 32.

The shape of the sealed space 32 is not particularly limited as long as the sealed space 32 has the curved wall surface 33. The shape of the sealed space 32 is a solid of revolution obtained by rotating a plane figure having a curved side satisfying the curvature about a line intersecting with the plane figure as a rotation axis, for example.

In the present embodiment, a case in which the sealed space 32 has a shape of a spheroid will be described.

As spheroid is a solid of revolution obtained by rotating an ellipse about the long axis or the short axis thereof as a rotation axis. The shape of the sealed space 32 may be a solid of revolution obtained by rotating an ellipse either about the long axis or the short axis thereof as a rotation axis. In terms of a shorter stroke S, the sealed space 32 has preferably the shape of a solid of revolution obtained by rotating an ellipse about the long axis thereof as a rotation axis.

The light emitter 34 is a device configured to emit light. The light emitter 34 at least has a light emitting face F provided in the sealed space 32. Specific examples of the light emitter 34 include a light emitting diode (LED) and a halogen lamp, but the light emitter 34 is not limited thereto. In terms of miniaturization of the three-dimensional modeling head 20 and a shorter stroke S, an LED is preferably used for the light emitter 34.

The size of the light emitter 34 is not particularly limited, but the light emitter 34 is preferably smaller in terms of a smaller stroke S.

The light emitting face F of the light emitter 34 is placed at a position containing a first focal point of two focal points in the spheroidal sealed space 32. More specifically, the light emitter 34 is positioned so that the light emitting face F thereof contains the first focal point. When the sealed space 32 has a spheroidal shape, the second focal point is coincident with the focusing position. Note that the light emitter 34 is preferably position so that the center thereof is coincident with the first focal point.

Specifically, when the shape of the sealed space 32 is a spheroid, positioning of the light emitter 34 at the first focal point allows light R emitted by the light emitter 34 and reflected by the wall surface 33 to be entirely focused onto the focusing position O (see FIG. 4). Thus, when the shape of the sealed space 32 is a spheroid, the light focusing rate at the focusing position O can be improved.

Figure 5:
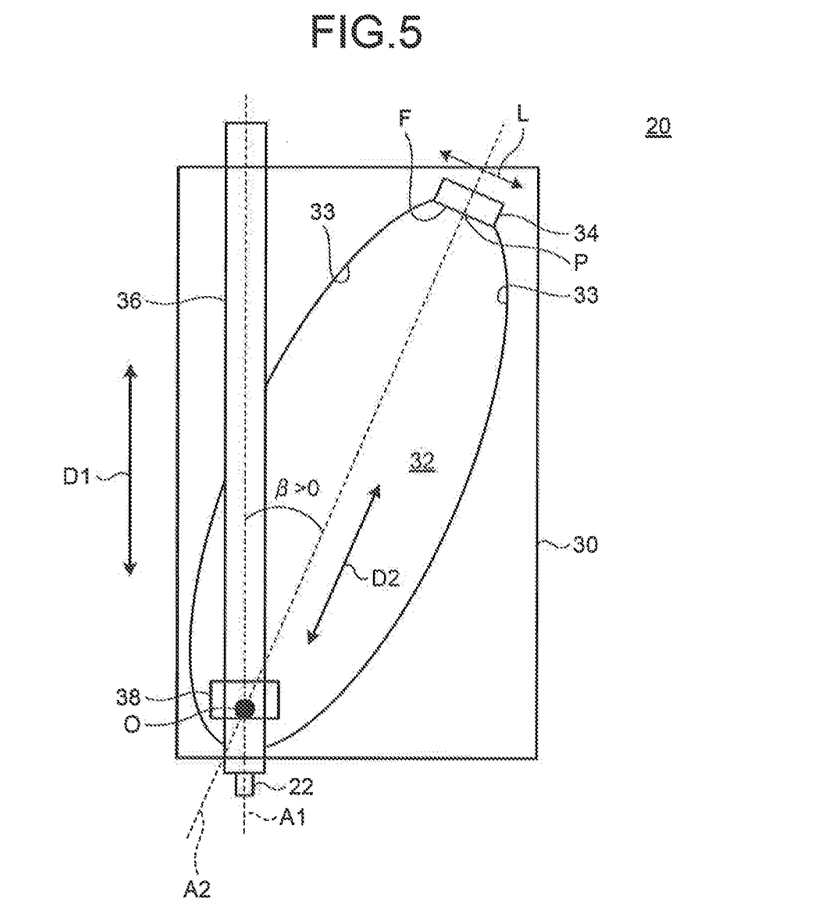
FIG. 5 is an explanatory diagram of a cross-sectional shape of a sealed space.

The shape of the spheroidal sealed space 32 preferably satisfies the following conditions.

FIG. 5 is an explanatory diagram of a cross-sectional shape of the spheroidal sealed space 32 containing a second axis A2. A second direction D2 is a direction along the second axis A2. The second axis A2 is a line connecting the first focal point and the second focal point in the sealed space 32. Thus, the spheroidal sealed space 32 is a solid of revolution obtained by rotation about the second axis A2 as a rotation axis.

Note that the second axis A2 is coincident with a line connecting the center of the light emitting face F of the light emitter 34 and the focusing position O. In the present embodiment, since the sealed space 32 has a spheroidal shape, the second axis A2 is coincident with the long axis or the short axis of the spheroidal sealed space 32.

The sectional shape (the sectional shape in the second direction D2) of the sealed space 32 containing the second axis A2 connecting the first focal point and the second focal point is expressed by the following Expressions (1) and (2):

$$x = \frac{C^2 - \alpha^2}{2(C - \alpha \sin\theta)} \cos\theta, \quad (1)$$

$$y = \frac{C^2 - \alpha^2}{2(C - \alpha \sin\theta)} \sin\theta. \quad (2)$$

In Expression (1), x represents a position coordinate in the direction perpendicular to the second direction D2 with respect to the second focal point that is the light focusing position O as the origin. In Expression (2), y represents a position coordinate in the second direction D2 with respect to the second focal point that is the light focusing position O as the origin. In Expressions (1) and (2), C is a constant. In Expressions (1) and (2), $\theta$ is a parameter equal to or larger than 0 but smaller than $2\pi$.

The shape expressed by the Expressions (1) and (2) is an ellipse. In Expressions (1) and (2), $\alpha$ represents the $y$ coordinate of the first focal point P where the light emitting face F of the light emitter 34 is placed. Thus, $\alpha$ represents the shortest distance from the light focusing position O that is the origin to the first focal point P.

In Expressions (1) and (2), C preferably satisfies the following Expression (3) or Expression (4):

$$C \geq \frac{L + \sqrt{L^2 + 4\alpha^2}}{2}, \quad (3)$$

$$C = \frac{L + \sqrt{L^2 + 4\alpha^2}}{2}. \quad (4)$$

In Expressions (3) and (4), L represents the length of a side of a sectional face of the light emitter 34 continuous to the light emitting face F, the sectional face being taken along the second direction D2 passing through the center P of the light emitting surface F (see L in FIG. 5).

When C in Expressions (1) and (2) satisfies the relation of Expression (3), the light emitting face F of the light emitter 34 can be placed at a position containing the first focal point P in a manner that the light emitting face F will not interfere with the wall surface 33.

When C in Expressions (1) and (2) satisfies the relation of Expression (4), the length of the sealed space 32 in the direction perpendicular to the second direction D2 can be made smallest. The sealed space 32 can thus be made compact.

The description refers back to FIGS. 3 and 4, in which the cylindrical member 36 ejects the thermoplastic resin 18 through the nozzle 22. The cylindrical member 36 is a cylindrical member having the longitudinal direction in the first direction D1. The cylindrical member 36 has a through-hole communicating one end with the other end in the first direction D1. In this manner, the cylindrical member 36 has a cylindrical shape.

The nozzle 22 is provided at one end in the first direction D1 of the cylindrical member 36. To the other end in the first direction D1 of the cylindrical member 36, the thermoplastic resin 18 formed into a filament is supplied from the cartridge 16 (not illustrated in FIGS. 3 and 4; see FIG. 1). The cylindrical member 36 ejects the thermoplastic resin 18 supplied from the cartridge 16 through the nozzle 22.

The cylindrical member 36 is positioned to extend through the heat insulating member 30 via the sealed space 32. The cylindrical member 36 may be made of a material having a melting point higher than that of the thermoplastic resin 18 passing therein. The cylindrical member 36 is made of brass, for example. Note that the material for the cylindrical member 36 is not limited to brass.

The inner diameter of the cylindrical member 36 (the diameter of the through-hole) may be appropriately adjusted according to the diameter of the thermoplastic resin 18 or the like. The inner diameter of the cylindrical member 36 is 1.5 mm, for example. The length in the first direction D1 of the cylindrical member 36 is 20 mm, for example. The inner diameter of the nozzle 22 is 0.35 mm, for example. These sizes are exemplary only and are not limited to these numerical values.

The light absorbing member 38 is a member that absorbs light. The light absorbing member 38 is provided in contact with at least part of the cylindrical member 36 in the sealed space 32. The area in the cylindrical member 36 where the light absorbing member 38 is provided is the melting area for melting the thermoplastic resin 18.

The light absorbing member 38 is provided in an area in the sealed space 32 containing the focusing position O on which light emitted by the light emitter 34 and reflected by the wall surface 33 is focused.

The light absorbing member 38 may have any shape as long as the light absorbing member 38 is provided in the area containing the focusing position O and in contact with at least part of the cylindrical member 36. For example, the light absorbing member 38 may have a cylindrical shape covering the outer circumference of the cylindrical member 36 in the circumference direction. In addition, the area occupied by the light absorbing member 38 is not limited as long as the light absorbing member 38 is provided in the area containing the focusing position O and in contact with at least part of the cylindrical member 36.

Note that the light absorbing member 38 is preferably provided in an area from the focusing position O to an end of the cylindrical member 36 on the side of ejection of the thermoplastic resin 18 (on the side of the nozzle 22). Provision of the light absorbing member 38 in this area allows efficient heating of the thermoplastic resin 18 by the light absorbing member 38.

In the present embodiment, a case in which the light absorbing member 38 has a cylindrical shape covering the area containing the end of the cylindrical member 36 in the first direction D1 on the side of the nozzle 22 and the focusing position O in the circumference direction of the cylindrical member 36 will be described.

The light absorbing member 38 is made of a material that absorbs light emitted by the light emitter 34. The light absorbing member 38 is formed by applying a black coating to a position of the cylindrical member 36 satisfying the conditions. Alternatively, the light absorbing member 38 may be formed by applying or attaching a material having a high light absorbing property to the position of the cylindrical member 36 satisfying the conditions. An example of the material having a high light absorbing property is aluminum surface-treated with alumite, but the material is not limited thereto.

As illustrated in FIG. 5, the cylindrical member 36 is preferably positioned so that an angle β between the second direction D2 along the second axis A2 when the focusing position O is the origin and the first direction D1 that is the longitudinal direction of the cylindrical member 36 is larger than 0°.

As the angle β is larger, part of the outer circumferential surface of the cylindrical member 36 and the position of the light emitter 34 overlap less in placement of the light emitter 34 and the cylindrical member 36. Furthermore, as the light emitting face F of the light emitter 34 is larger, the placement of the cylindrical member 36 and the light emitter 34 may be adjusted to make the angle β larger.

Next, functions of the three-dimensional modeling heads 20 will be described with reference to FIG. 4.

As illustrated in FIG. 4, light R emitted by the light emitter 34 is reflected by the wall surface 33 of the sealed space 32 and focused on the focusing position O. The light absorbing member 38 is provided at the focusing position. Thus, light focused on the focusing position is absorbed by the light absorbing member 38. As a result, at the focusing position O in the light absorbing member 38, heat corresponding to energy of absorbed light is generated and the temperature rises.

The light absorbing member 38 is provided in contact with at least part of the cylindrical member 36 in the sealed space 32. The heat generated by the light absorbing member 38 is transferred to the cylindrical member 36 and heats the area (melting area) of the cylindrical member 36 in contact with the light absorbing member 38.

The controller 19 (see FIG. 1) thus adjusts the emission energy of the light emitter 34 so that the temperature at the focusing position O becomes a target temperature equal to or higher than the melting point of the thermoplastic resin 18. The emission energy is adjusted by a known method such as adjustment of electric energy applied to the light emitter 34 or the lighting rate of the light emitter 34. As a result of adjusting the emission energy of the light emitter 34, the light absorbing member 38 generates heat at the target temperature.

For example, the inner diameter of the cylindrical member 36 is assumed to be 1.5 mm and the length of the cylindrical member 36 in the first direction D1 is assumed to be 20 mm. In addition, a halogen lamp with the light emitting face F having a size of 4 mm×5 mm is used as the light emitter 34. In this case, when power of 8 W is applied to the light emitter 34, the temperature of the light absorbing member 38 becomes about 200° C.

The thermoplastic resin 18 supplied into the cylindrical member 36 and then reaching the area (melting area) in the cylindrical member 36 where the light absorbing member 38 is provided is heated to a target temperature equal to or higher than the melting point of the thermoplastic resin 18. As a result, the thermoplastic resin 18 is melted and ejected through the nozzle 22.

Note that the focusing position O is located inside of the sealed space 32. Since the sealed space 32 is a space that is sealed, the sealed space 32 has a high thermal insulation.

The temperature of the light absorbing member 38 provided at the position containing the focusing position O is therefore less likely to be affected by the environmental temperature outside of the heat insulating member 30.

As described above, the three-dimensional modeling head 20 according to the present embodiment includes the heat insulating member 30 in which the sealed space 32 is provided, the cylindrical member 36, the light absorbing member 38, and the light emitter 34. The sealed space 32 has the curved wall surface 33 that reflects light. The light emitter 34 at least has the light emitting face F provided in the sealed space 32 and is configured to emit light. The cylindrical member 36 is positioned to extend through the heat insulating member 30 via the sealed space 32. The cylindrical member 36 is a cylindrical member having the longitudinal direction in the first direction D1 in which the thermoplastic resin 18 is ejected. The light absorbing member 38 is provided in contact with at least part of the cylindrical member 36 in the sealed space 32. Furthermore, the light absorbing member 38 is provided in an area in the sealed space 32 containing the focusing position O on which light emitted by the light emitter 34 and reflected by the wall surface 33 is focused. Since the sealed space 32 is a space that is sealed by the heat insulating member 30, the sealed space 32 serves as heat insulation. The sealed space 32 also serves as a collector focusing light onto the focusing position O by the wall surface 33.

In this manner, the three-dimensional modeling head 20 positions the light emitting face F of the light emitter 34 inside the sealed space 32 provided in the heat insulating member 30 to reflect light emitted by the light emitter 34 by the wall surface 33 of the sealed space 32. In addition, the light absorbing member 38 is positioned in the area in the sealed space 32 containing the focusing position O on which the light is focused and in contact with at least part of the cylindrical member 36 that ejects the thermoplastic resin 18.

As described above, the three-dimensional modeling head 20 according to the present embodiment has such a structure that the temperature of the light absorbing member 38 provided at the position containing the focusing position O is less likely to be affected by the environmental temperature outside of the heat insulating member 30.

The three-dimensional modeling head 20 according to the present embodiment can therefore reduce the influence of the temperature in the external environment on the melting area where the thermoplastic resin 18 is melted.

Furthermore, since the melting area where the thermoplastic resin 18 is melted is less likely to be affected by the temperature in the external environment, the three-dimensional modeling head 20 can accurately control the temperature of the light absorbing member 38 to a temperature equal to or higher than the melting point of the thermoplastic resin 18.

Furthermore, since the melting area is less likely to be affected by the temperature in the external environment, the three-dimensional modeling head 20 according to the present embodiment can shorten the stroke S that is a distance between adjacent nozzles 22 as compared to the related art.

Specifically, in the related art, the stroke S has to be about 30 mm or longer so as to reduce the influence of the temperature in the external environment. In contrast, with the three-dimensional modeling head 20 according to the present embodiment, it is confirmed that the influence of the temperature in the external environment on the melting area can be reduced even with the stroke S of about 6 mm.

With the head unit 12A including multiple three-dimensional modeling heads 20 arranged as in the structure described above (see FIG. 1), therefore, the influence of the temperature in the external environment can be reduced in each of the three-dimensional modeling heads 20 and the stroke S between adjacent nozzles 22 can also be shorter than that in the related art.

Furthermore, with the three-dimensional modeling device 10 including such a head unit 12A (see FIG. 1), the stroke S between nozzles 22 of the three-dimensional modeling heads 20 can be made shorter than that in the related art. The three-dimensional modeling device 10 according to the present embodiment can therefore make the movement amount of the head unit 12 (see FIG. 1) in the X-axis direction or the Y-axis direction smaller than that in the related art.

The three-dimensional modeling device 10 according to the present embodiment can therefore reduce the influence of the temperature in the external environment on the melting area where the thermoplastic resin 18 is melted and shorting the time taken for modeling the three-dimensional modeled object 24.

Second Embodiment

In the embodiment described above, the description is made on a case in which the light emitter 34 and the cylindrical member 36 are positioned so that the angle 3 between the second direction D2 when the focusing position O is the origin and the first direction D1 is larger than 0°.

Figure 6:
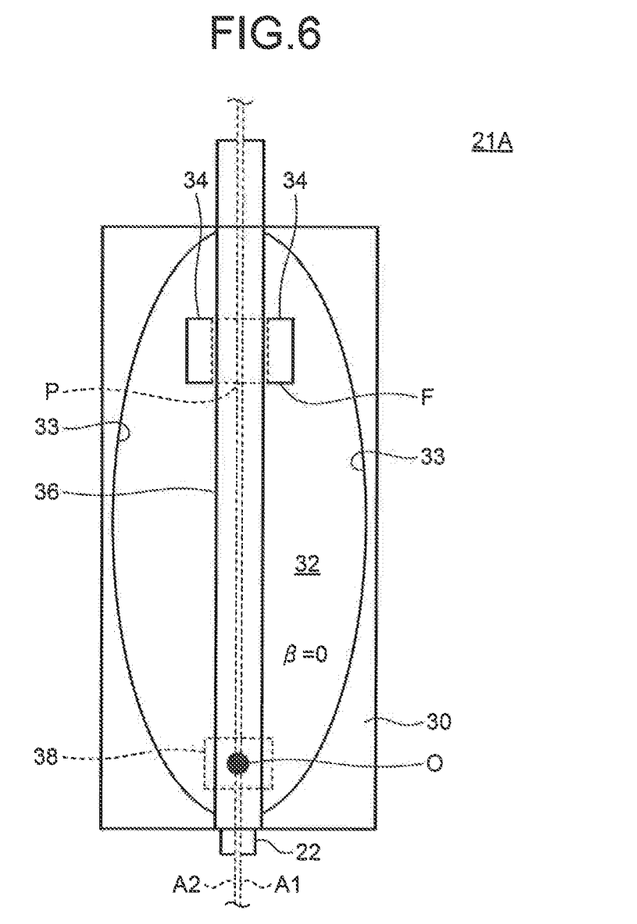
FIG. 6 is a diagram illustrating a three-dimensional modeling head.

In the present embodiment, the light emitter 34 and the cylindrical member 36 are positioned so that the angle θ between the second direction D2 when the focusing position O is the origin and the first direction D1 is 0°.

FIG. 6 is a schematic diagram illustrating a three-dimensional modeling head 21A according to the present embodiment.

The three-dimensional modeling head 21A has a structure similar to that of the three-dimensional modeling head 20 according to the first embodiment except that the light absorbing member 38 and the cylindrical member 36 are positioned so that the angle β becomes 0°.

In the present embodiment, the light emitter 34 has an annular shape covering the cylindrical member 36. The light emitter 34 is positioned so that a first focal point P is contained inside the annular shape formed by a light emitting face F thereof.

For example, the light emitter 34 includes multiple LEDs, which are arranged in the circumferential direction of the cylindrical member 36. In this manner, the light emitter 34 has an annular shape. In this case, the light emitter 34 is positioned so that the center position (corresponding to inside of the cylindrical member 36) of the annular shape formed by arranging the LEDs in the circumferential direction of the cylindrical member 36 is coincident with the first focal point P.

Furthermore, in the present embodiment, the light emitter 34 is thermally bonded to the cylindrical member 36. Specifically, the light emitter 34 is thermally bonded to the cylindrical member 36 at a bonding area of the cylindrical member 36 in contact with the light emitter 34. Note that the bonding area of the cylindrical member 36 may have a layer of a heat resistant material. As a result of forming a layer of a heat resistant material in the bonding area, the thermal resistance is reduced. The heat resistant material may be a heat resistant grease.

As described above, in the three-dimensional modeling head 21A according to the present embodiment, the light emitter 34 and the cylindrical member 36 are positioned so that the angle β between the second direction D2 when the focusing position O is the origin and the first direction D1 is 0°.

The length of the three-dimensional modeling head 21A in the direction intersecting with the second axis A2 can therefore be made shorter than that in the first embodiment.

The three-dimensional modeling head 21A can therefore be made smaller in addition to the effects of the first embodiment.

Furthermore, use of the three-dimensional modeling head 21 instead of the three-dimensional modeling head 20 according to the first embodiment can make the head unit 12 of the three-dimensional modeling device 10 (see FIG. 1) smaller.

Furthermore, the light emitter 34 is thermally connected to the cylindrical member 36. As a result, heat can be radiated easily from the light emitter 34. Furthermore, with the three-dimensional modeling head 21A, thermal energy generated by the light emitter 34 is transferred from the light emitter 34 toward the light absorbing member 38 along the cylindrical member 36. The rise in the temperature in the area of the cylindrical member 36 where the light absorbing member 38 is provided can thus be assisted.

Furthermore, with the three-dimensional modeling device 10 (see FIG. 1) including the three-dimensional modeling head 21A according to the present embodiment instead of the three-dimensional modeling head 20 according to the first embodiment can produce the same effects as in the first embodiment.

Third Embodiment

In the embodiments described above, a case in which the sealed space 32 has a spheroidal shape is described. The shape of the sealed space 32, however, may be any shape with the wall surface 33 having such a curvature at which at least part of light emitted by the light emitter 34 is focused on the focusing position O, and is not limited to a spheroid.

Figure 7:
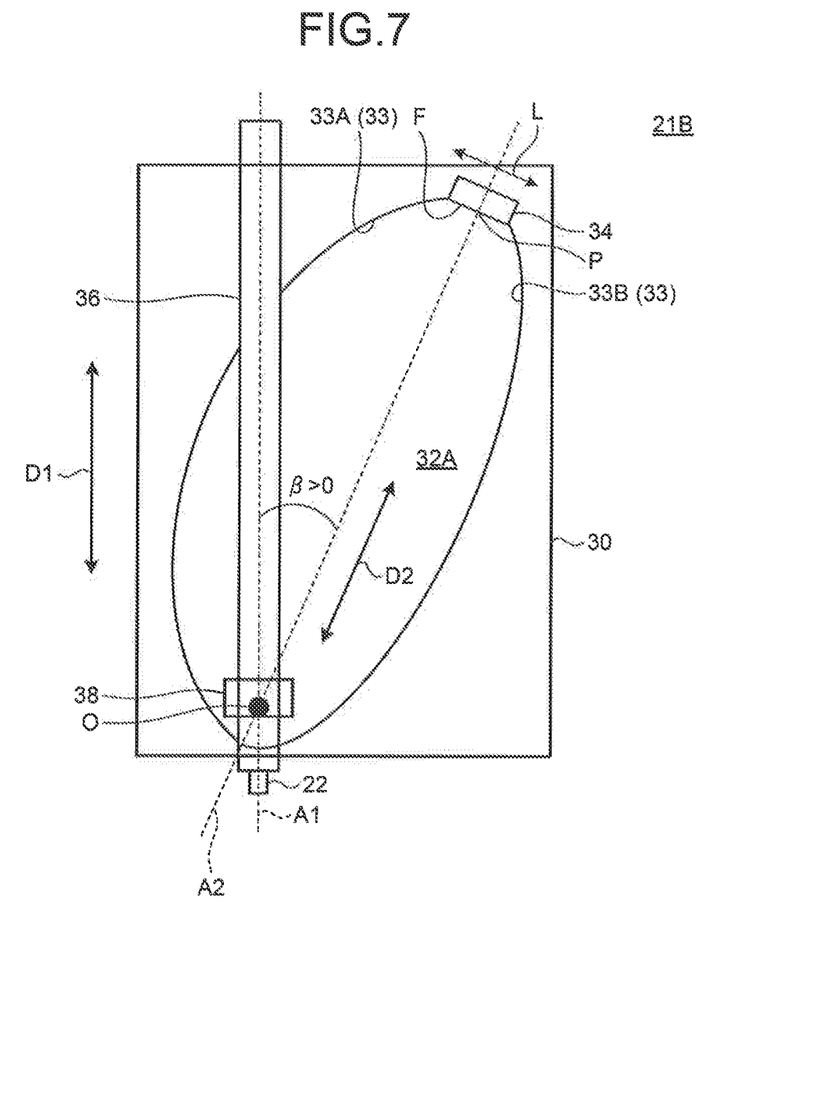
FIG. 7 is a diagram illustrating a three-dimensional modeling head.

FIG. 7 is a schematic diagram illustrating a three-dimensional modeling head 21B according to the present embodiment. FIG. 7 illustrates a cross section of the three-dimensional modeling head 21B taken along a plane including the first axis A1 and the second axis A2. As illustrated in FIG. 7, the cross section of the sealed space 32A in the three-dimensional modeling head 21B has a shape including a curved side 33A and a curved side 33B with the second axis A2 at the center. The curved side 33A and the curved side 33B have different curvatures.

Note that the three-dimensional modeling head 21B has a structure similar to that of the first embodiment except that a sealed space 32A having a different sectional shape from that of the sealed space 32 in the first embodiment is provided instead of the sealed space 32.

With the three-dimensional modeling head 21B, at least part of light R emitted by the light emitter 34 is reflected by the wall surface 33 of the sealed space 32A and focused on the focusing position O similarly to the first embodiment. A light absorbing member 38 is provided at the focusing position. Thus, light focused on the focusing position is absorbed by the light absorbing member 38. As a result, at the focusing position O in the light absorbing member 38, heat corresponding to energy of absorbed light is generated and the temperature rises.

With the three-dimensional modeling head 21B, the same effects as those in the first embodiment can therefore be produced.

Furthermore, with the three-dimensional modeling device 10 (see FIG. 1) including the three-dimensional modeling head 21B according to the present embodiment instead of the three-dimensional modeling head 20 according to the first embodiment can produce the same effects as in the first embodiment.

Fourth Embodiment

Figure 8:
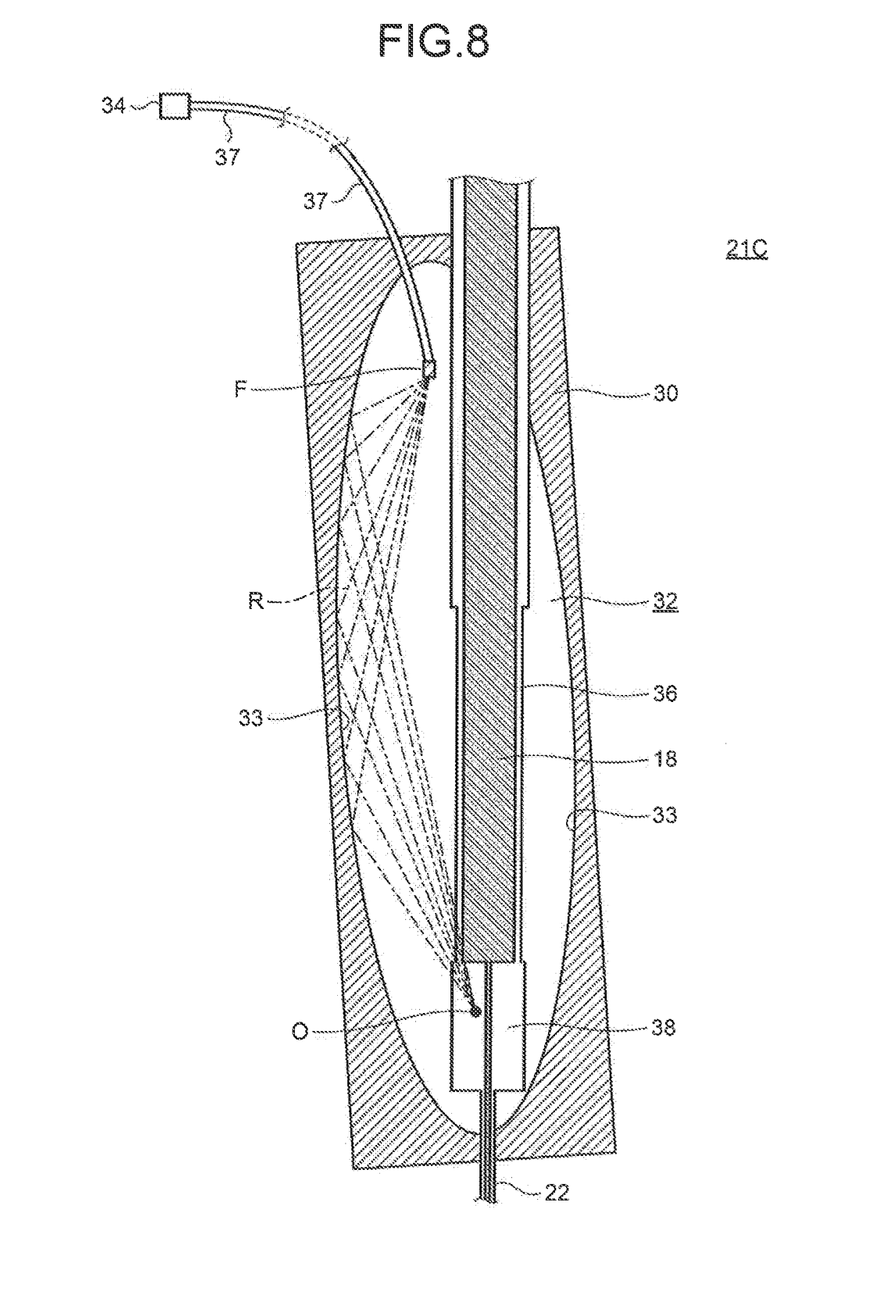
FIG. 8 is a diagram illustrating a three-dimensional modeling head.

In the present embodiment, the light emitter 34 is connected to an optical fiber.

FIG. 8 is a diagram illustrating a three-dimensional modeling head 21C according to the present embodiment. The three-dimensional modeling head 21C further includes an optical fiber 37 in addition to the three-dimensional modeling head 20 of the first embodiment.

One end of the optical fiber 37 in the longitudinal direction thereof is the light emitting face F of the light emitter 34. Thus, in the present embodiment, the three-dimensional modeling head 21C, the light emitter 34 can be placed outside of the sealed space 32.

When multiple three-dimensional modeling heads 21C according to the present embodiment are arranged in the direction intersecting with the first direction D1 of the cylindrical member 36, the stroke S can therefore be made even shorter than that in the embodiments described above.

Figure 9:
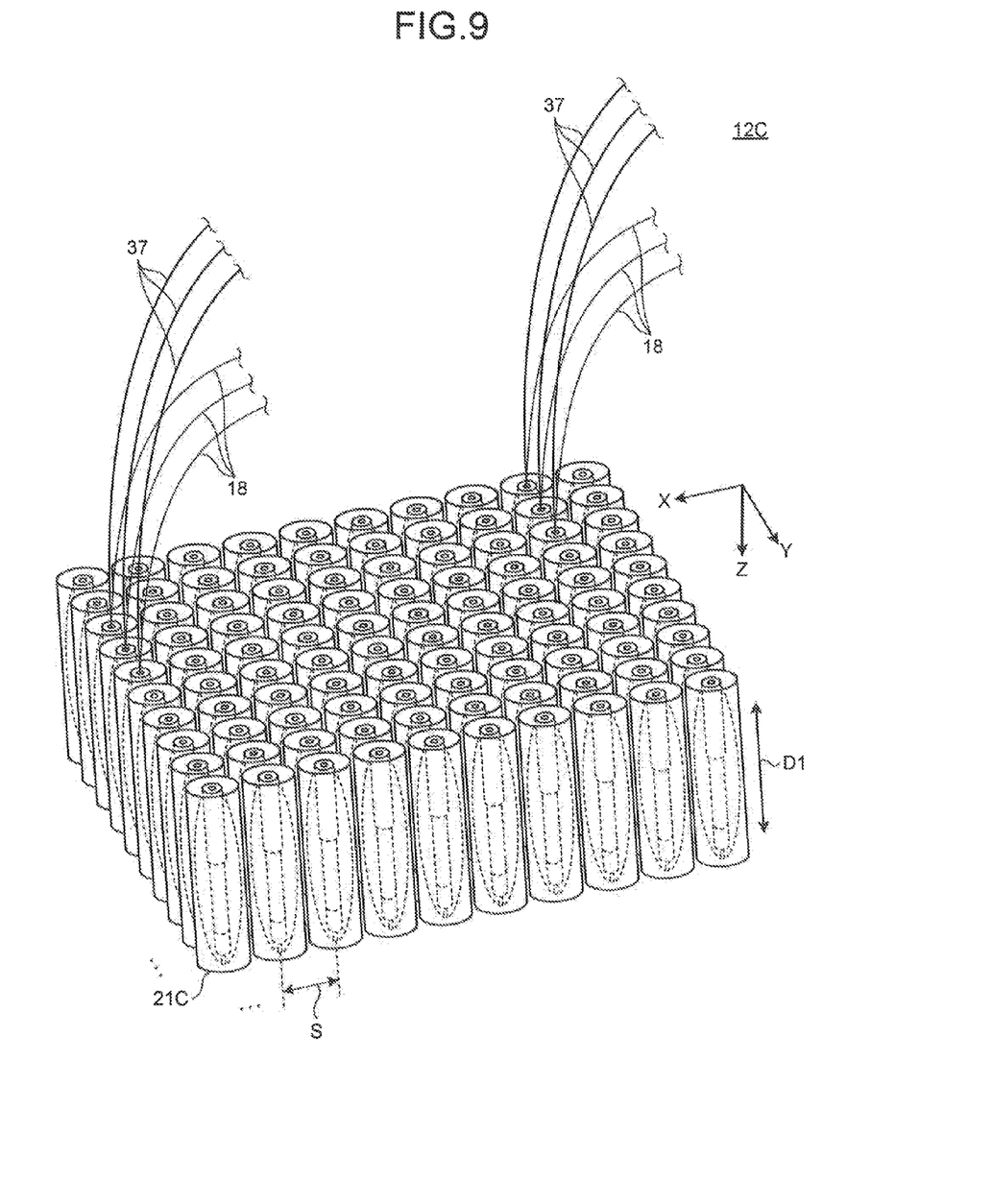
FIG. 9 is a diagram illustrating a head part.

FIG. 9 is a diagram illustrating a head unit 12C. The head unit 12C according to the present embodiment includes multiple three-dimensional modeling heads 21C arranged in the direction intersecting with the first direction D1 of the cylindrical members 36 of the respective three-dimensional modeling heads 21C.

Each of the three-dimensional modeling heads 21C provided in the head unit 12C has an optical fiber 37, in which one end in the longitudinal direction of the optical fiber 37 corresponds to the light emitting face F of the light emitter 34 (not illustrated in FIG. 9). The optical fiber 37 has a diameter of about 1 µm.

With the three-dimensional modeling head 21C according the present embodiment, the stroke S can thus be made even shorter than that in the embodiments described above. Specifically, the stroke S can be made smaller to about 1 µm corresponding to the diameter of the optical fiber 37.

Thus, as a result of mounting the three-dimensional modeling head 21C according to the present embodiment instead of the three-dimensional modeling head 20 according to the first embodiment, the three-dimensional modeling device 10 (see FIG. 1) can further shorten the time taken for modeling as compared to that in the embodiments described above.

Furthermore, the three-dimensional modeling head 21C according to the present embodiment can realize highly precise shaping as compared to the embodiments described above.

Furthermore, with the three-dimensional modeling head 21C according to the present embodiment, the light emitter 34 can be installed outside of the three-dimensional modeling head 21C. The three-dimensional modeling head 21C can therefore be made even smaller.

Furthermore, with the three-dimensional modeling head 21C according to the present embodiment, the number of three-dimensional modeling heads 21C that can be arranged within a unit area can be increased as compared to the embodiments described above. The three-dimensional modeling head 21C according to the present embodiment can therefore realize more precise shaping using thermoplastic resins 18 of a larger number of colors as compared to the embodiments described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A three-dimensional modeling head comprising:
a heat insulating member having a sealed space therein with a curved wall surface that reflects light;
a light emitter that emits light and has at least a light emitting face provided in the sealed space;
a cylindrical member that is placed to extend through the heat insulating member via the sealed space and extends lengthwise in a first direction in which thermoplastic resin is ejected; and
a light absorbing member that adsorbs light and is provided in contact with at least part of the cylindrical member in the sealed space and in an area of the sealed space containing a focusing position on which at least part of light emitted by the light emitter and reflected by the wall surface is focused.

2. The head according to claim 1, wherein the sealed space has a shape of a solid of revolution obtained by rotating a plane figure having a curved side about a line intersecting with the plane figure as a rotation axis.

3. The head according to claim 1, wherein the sealed space has a spheroidal shape.

4. The head according to claim 1, wherein an angle between the first direction where the focusing position is an origin and a second direction along a second axis connecting a center of the light emitting face and the focusing position is larger than 0°.

5. The head according to claim 1, wherein an angle between the first direction where the focusing position is an origin and a second direction along a second axis connecting a center of the light emitting face of the light emitter and the focusing position is 0°.

6. The head according to claim 5, wherein the light emitter is thermally connected to the cylindrical member.

7. The head according to claim 1, wherein
the light emitter is provided at a first focal point in the sealed space having a spheroidal shape; and
the light absorbing member is provided at the focusing point that is a second focal point in the sealed space.

8. The head according to claim 7, wherein a cross section containing a second axis connecting the first focal point and the second focal point in the spheroidal sealed space has a shape expressed by the following Expressions (1) and (2):

$$x = \frac{C^2 - \alpha^2}{2(C - \alpha \sin\theta)} \cos\theta, \quad (1)$$

$$y = \frac{C^2 - \alpha^2}{2(C - \alpha \sin\theta)} \sin\theta, \quad (2)$$

wherein, in Expression (1), x represents a position coordinate in the direction perpendicular to the second direction with respect to the second focal point as the origin, in Expression (2), y represents a position coordinate in the second direction with respect to the second focal point as the origin, in Expressions (1) and (2), C is a constant, in Expressions (1) and (2), θ is a parameter equal to or larger than 0 but smaller than 2 π, and in Expressions (1) and (2), a represents a shortest distance from the origin to the first focal point.

9. The head according to claim 8, wherein C in Expression (1) satisfies a relation of the following Expression (3) or (4):

$$C \geq \frac{L + \sqrt{L^2 + 4\alpha^2}}{2}, \quad (3)$$

$$C = \frac{L + \sqrt{L^2 + 4\alpha^2}}{2}, \quad (4)$$

wherein, in Expressions (3) and (4), L represents a length of a side of a sectional face of the light emitter continuous to the light emitting face, the sectional face being taken along the second direction passing through a center of the light emitting surface.

10. The head according to claim 1, wherein the wall surface regularly reflects the emitted light.

11. The head according to claim 1, wherein the light absorbing member is provided in an area from the focusing position to an end of the cylindrical member in a direction in which the thermoplastic resin is ejected.

12. The head according to claim 1, further comprising an optical fiber whose one end n a longitudinal direction is the light emitting face.

13. A three-dimensional modeling device comprising the three-dimensional modeling head according to claim 1.

14. The device according to claim 13, wherein multiple three-dimensional modeling heads are arranged in a direction intersecting with the first direction.

* * * * *